April 16, 1957 A. R. CAUSSÉ 2,788,867
SHOCK ABSORBER WITH COMPRESSIBLE PISTON
Filed Jan. 4, 1954
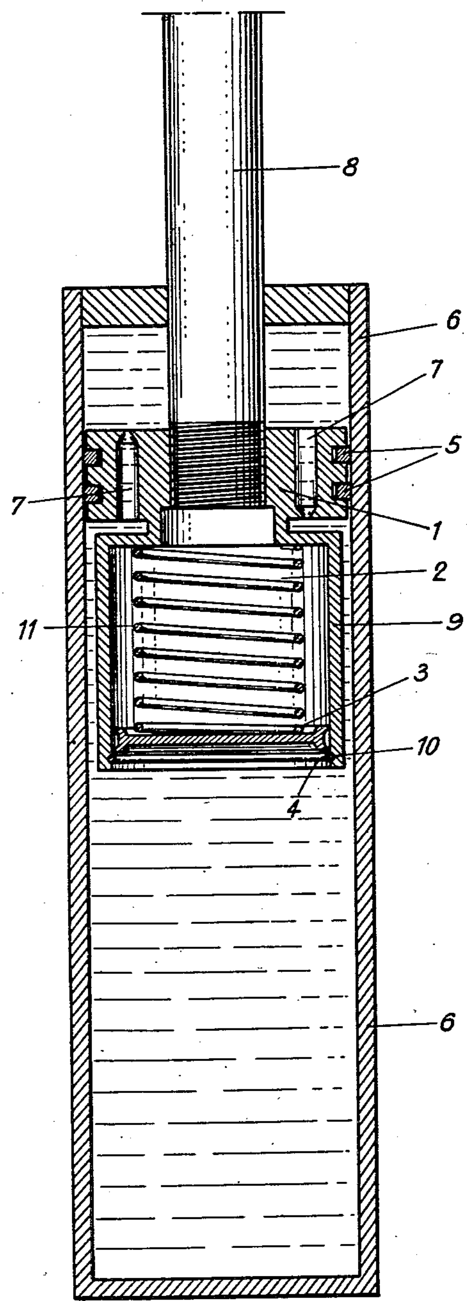
INVENTOR
ANTOINE ROGER CAUSSÉ
BY [signature]

United States Patent Office 2,788,867

Patented Apr. 16, 1957

2,788,867

SHOCK ABSORBER WITH COMPRESSIBLE PISTON

Antoine Roger Caussé, Toulouse, France

Application January 4, 1954, Serial No. 402,025

Claims priority, application France January 10, 1953

3 Claims. (Cl. 188—88)

The present invention relates to a telescopic hydraulic shock-absorber which is provided with a novel device for compensating the volume of oil or other fluid displaced by the piston-rod advancing into the cylinder.

Up to the present, the volume of the piston-rod has been compensated either by the use of a tube placed outside the working cylinder, or by the provision of a compensating chamber inside the working cylinder, in the lower or upper part thereof. These devices are expensive and have been found in practice to present certain drawbacks, such as fragility and short-lived efficiency.

The shock-absorber according to the present invention has the advantage of being very simple, easy and cheap to manufacture and of lasting efficiency. Its operation is continuous and progressive and ensures an increased smoothness and comfort in modern automobile suspensions.

This shock-absorber is mainly characterised in that its piston is provided with a hollow extension enclosing a resiliently compressible element which is submitted to the pressure of the fluid contained in the cylinder. During the operation of the shock-absorber, when the piston is caused to advance in the cylinder, the volume of fluid displaced by penetration of the piston-rod into the cylinder is compensated by the compression of said resiliently compressible element.

In an embodiment of the invention, the resiliently compressible element is a volume of air enclosed in the hollow extension, behind a movable wall which is adapted to slide like a piston in said hollow extension.

Other features and embodiments of the invention will become apparent from the following specification and the appended drawing which shows by way of example a diagrammatic axial section of a telescopic hydraulic shock-absorber according to the invention.

In the shown embodiment, the shock-absorber comprises a piston 1 of light metal or any other material which slides in a cylinder 6 and carries a hollow extension in the shape of a bell 9 enclosing an air chamber 2. In the bell 9 is slidably mounted a movable wall 3 the outward course of which is limited by a resilient ring 4 engaged into a groove 10 formed near the lower end of the bell 9. The piston 1 which slides in the internally calibrated cylinder 6 has a diameter approaching the inner diameter of said cylinder, or preferably said piston is provided with piston rings 5 of bronze or other material, so that the oil passing from one side of the piston 1 to the other is compelled to pass through the calibrated apertures 7, which may be controlled by valves mounted in the piston.

When the shock-absorber receives a shock, the piston 1 is displaced downwards in the cylinder 6. The volume of oil displaced by the piston-rod 8 which penetrates into the cylinder 6 causes the movable wall 3 to be lifted and an equivalent volume of oil enters the lower part of the bell 9, the air being compressed between the movable wall 3 and the opposite wall of the bell 9. The pressure of the air compressed in chamber 2 increases as the piston 1 descends in the cylinder 6, so that the effect of the shock-absorber is progressive and its efficiency increases in direct ratio with the intensity of the shocks to be absorbed.

When the piston 1 is subsequently raised, the wall 3 resumes its initial position, being pushed on the one hand by the pressure of the air enclosed in the chamber 2, and being drawn on the other hand by the depression of the withdrawing oil. The braking of the expansion is ensured by the resistance opposed by the narrow apertures 7 of the piston to a quick passage of the oil.

In order to assist the return movement of the movable wall 3, a spring 11 may be placed in the chamber 2, between the movable wall 3 and the opposite wall of the bell 9.

According to another embodiment of the invention, the air chamber 2 and movable wall 3 may be replaced by a pocket made of flexible oil-resistant material and filled with air. Said pocket may for example have the shape of a cylindrical bellows, or any other convenient shape.

According to still another embodiment of the invention, the hollow extension 9 of the piston may enclose an alveolate spongy material or any other resiliently compressible substance which is adapted to yield the desired compensating effect.

I claim:

1. A telescopic hydraulic shock absorber comprising a cylinder, a calibrated volume of fluid in said cylinder, a piston slidably mounted in said cylinder and formed with at least one calibrated aperture for allowing the passage of fluid from one side of the piston to the other through said aperture only when the piston slides in the cylinder, a piston rod slidably traversing one end wall of said cylinder and having its inner end attached to said piston, and means for compensating the volume of fluid displaced by the piston rod when the latter penetrates into the cylinder, said means comprising an extension chamber on the side of the piston remote from said piston rod, said chamber having an opening only in one wall thereof and placing said chamber in communication with said cylinder, stop means around said chamber opening, a rigid wall slidably mounted in said chamber parallel with said opening and having its edges sealingly engaging the inner wall of the chamber to prevent egress of fluid into said chamber behind said rigid movable wall, and resiliently compressible means within said chamber and urging said rigid movable wall toward said stop means to close said opening but permitting retraction of said wall as it is submitted to the increased pressure of the fluid contained in the cylinder, whereby the portion of said chamber exposed by retraction of said rigid wall corresponds to the volume of fluid displaced by the piston rod.

2. A shock absorber as set forth in claim 1 wherein said resiliently compressible means comprise a volume of compressed air within the chamber.

3. A shock absorber as set forth in claim 1 wherein said resiliently compressible means comprise a volume of compressed air and a compressed coil spring within the chamber.

References Cited in the file of this patent

UNITED STATES PATENTS

| | | |
|---|---|---|
| 880,257 | Welch | Feb. 25, 1908 |
| 2,161,811 | Grebe | June 13, 1939 |
| 2,357,278 | O'Connor | Aug. 29, 1944 |

FOREIGN PATENTS

| | | |
|---|---|---|
| 395,410 | Great Britain | Oct. 15, 1934 |
| 670,786 | Great Britain | Apr. 23, 1952 |
| 1,054,308 | France | Oct. 7, 1953 |